US009114973B2

(12) United States Patent
Saltz et al.

(10) Patent No.: US 9,114,973 B2
(45) Date of Patent: Aug. 25, 2015

(54) FUEL DISPENSER SUMP

(75) Inventors: Gary J. Saltz, Verona, WI (US); Verge Manyen, Madison, WI (US)

(73) Assignee: Franklin Fueling Systems, Inc., Madison, WI (US)

( * ) Notice: Subject to any disclaimer, the term of this patent is extended or adjusted under 35 U.S.C. 154(b) by 190 days.

(21) Appl. No.: 12/702,541

(22) Filed: Feb. 9, 2010

(65) Prior Publication Data
US 2010/0206393 A1 Aug. 19, 2010

Related U.S. Application Data (60) Provisional application No. 61/152,548, filed on Feb. 13, 2009.

(51) Int. Cl.
*F16L 5/00* (2006.01)
*B67D 7/32* (2010.01)
*B67D 7/78* (2010.01)
*H02G 9/10* (2006.01)

(52) U.S. Cl.
CPC ............... *B67D 7/3209* (2013.01); *B67D 7/78* (2013.01); *H02G 9/10* (2013.01)

(58) Field of Classification Search
CPC .......... B67D 7/3209; B67D 7/78; B60S 5/02; B65D 90/105; E02D 31/00; F16L 5/02
USPC ......................... 137/312, 343, 363
See application file for complete search history.

(56) References Cited

U.S. PATENT DOCUMENTS

| 5,167,470 | A | | 12/1992 | Bertolozzi et al. | |
|---|---|---|---|---|---|
| 5,550,532 | A | * | 8/1996 | Marshall | 340/604 |
| 5,722,699 | A | * | 3/1998 | Brancher | 285/142.1 |

(Continued)

FOREIGN PATENT DOCUMENTS

WO WO 2008139158 A2 * 11/2008

OTHER PUBLICATIONS

Boudry, et al, Improved Sump, May 9, 2008, WIPO WO2008/139158.*

*Primary Examiner* — John K Fristoe, Jr.
*Assistant Examiner* — Seth W Mackay-Smith
(74) *Attorney, Agent, or Firm* — Faegre Baker Daniels LLP (57) ABSTRACT

A sump for a fuel dispenser which allows wiring to pass from beneath the ground vertically upwards through the footprint of the fuel dispenser without compromising a wall of the sump and without providing access to the ground positioned beneath the footprint of the fuel dispenser for a fluid contained within the fuel dispenser, including fuel leaks from the piping contained within the dispenser. In an exemplary embodiment, a sump frame is provided which mates with an open upper portion of the sump which provides access to the sump. The portion of the frame extending over the opening to the sump is generally open, allowing passage of fluids from within the fuel dispenser to the sump. The sump frame further includes a conduit entry frame adapter which extends beyond the perimeter of the sump, but which is positioned within the footprint of the fuel dispenser. A wiring conduit is formed in the conduit entry frame adapter so that wiring may be passed from beneath the footprint of the fuel dispenser vertically upward into the fuel dispenser, without compromising a wall forming the sump. Fluid within the fuel dispenser will fall downwardly either into the sump opening or into contact with the conduit entry frame adapter. In one exemplary embodiment, the conduit entry frame adapter is sloped downwardly toward the sump opening so that fluid contacting the conduit entry frame adapter will flow via gravity into the sump.

16 Claims, 5 Drawing Sheets

(56) References Cited

U.S. PATENT DOCUMENTS

| | | | |
|---|---|---|---|
| 5,800,143 A * | 9/1998 | Bravo | 405/52 |
| 5,813,797 A | 9/1998 | Pendleton et al. | |
| 5,819,975 A | 10/1998 | Pendleton et al. | |
| 7,401,621 B2 | 7/2008 | McCann | |
| 2010/0139807 A1 * | 6/2010 | Boudry et al. | 141/86 |

* cited by examiner

FUEL DISPENSER SUMP

CROSS REFERENCE TO RELATED APPLICATION

This application claims the benefit under Title 35, U.S.C. §119(e) of U.S. Provisional Patent Application Ser. No. 61/152,548, entitled FUEL DISPENSER SUMP, filed on Feb. 13, 2009, the entire disclosure of which is hereby expressly incorporated herein by reference.

BACKGROUND

1. Field of the Invention

The present invention relates to a sump for collecting leakage from fluid piping components within a fuel dispenser. More specifically, the present invention relates to a sump assembly for a fuel dispenser which allows wiring to pass from beneath the pavement of a fueling station, vertically upwards through the footprint of the fuel dispenser without compromising a wall forming the containment area of the sump and without providing access to the soil positioned beneath the footprint of the fuel dispenser for fluid contained within the fuel dispenser, including fuel leaks from the piping contained within the dispenser.

2. Description of the Art

Automotive fueling stations typically include one or more underground storage tanks which store the various fuel products dispensed by the fueling station. Each underground storage tank is connected to one or more fuel dispensers via one or more underground fuel delivery lines. As the fuel delivery line enters the area beneath the footprint of the above ground fuel dispenser, it traverses a vertical wall of a fluid sump positioned beneath the fuel dispenser and extends vertically into the fuel dispenser where it is fluidly connected to a dispenser nozzle. The sump is positioned underground beneath the footprint of the fuel dispenser to collect any fuel leaks from the piping which conveys fuel from the underground fuel delivery line to the dispenser nozzle.

Existing fuel dispenser designs further include electrical conduit which transports wiring underground to a position beneath the footprint of the fuel dispenser and thereafter travels vertically upward into the fuel dispenser. In certain prior designs, such wiring would traverse a vertical wall of the sump to achieve a position below the footprint of the fuel dispenser and would thereafter travel vertically upward into the above ground fuel dispenser. To position the wiring through a vertical wall of the sump, a conduit was formed in the sump wall to accommodate passage of the wiring therethrough. Such a conduit through the vertical wall of the sump creates a leak point for fuel collected in the sump to access the soil surrounding the sump. Furthermore, such a wiring conduit may allow for the passage of groundwater into the sump.

SUMMARY

The present invention provides a sump assembly for a fuel dispenser which allows wiring to pass from beneath the ground vertically upwards through the footprint of the fuel dispenser without compromising a wall of the containment area of the sump and without providing access to the soil positioned beneath the fuel dispenser for a fluid contained within the fuel dispenser, including fuel leaks from the piping or dispenser hydraulic system contained within the dispenser. In an exemplary embodiment, the present invention provides a sump frame which mates with an open upper portion of the sump opening which provides access to the sump. The portion of the sump frame extending over the opening to the sump is generally open, allowing passage of fluids from within the fuel dispenser to the sump. The sump frame further includes a conduit entry frame adapter which extends beyond the perimeter of the sump opening, but which is positioned within the footprint of the fuel dispenser. A wiring conduit is formed in the conduit entry frame adapter so that wiring may be passed from beneath the footprint of the fuel dispenser vertically upward into the fuel dispenser, without compromising a wall forming the sump. Fluid within the fuel dispenser will fall downwardly either into the sump opening or into contact with the conduit entry frame adapter. In one exemplary embodiment, the conduit entry frame adapter is sloped downwardly toward the sump opening so that fluid contacting the conduit entry frame adapter will flow via gravity into the sump.

The invention, in one form thereof, provides a fuel dispenser assembly including a fuel dispenser having a fuel dispenser housing including at least one substantially vertical wall defining a fuel dispenser footprint and a nozzle. A fuel delivery line is connected to the nozzle via a quantity of piping contained within the fuel dispenser housing, the fuel dispenser further includes a sump assembly including a sump having at least one sump wall defining a sump cavity and a sump frame removeably securable to the sump, the sump frame including conduit entry frame adapter extending beyond an exterior of the sump wall, the conduit entry frame adapter positioned within the footprint of the fuel dispenser, the footprint of the fuel dispenser positioned atop the sump assembly so that the footprint of the fuel dispenser is substantially coextensive with the sump assembly so that a fluid spill or splash within the fuel dispenser housing will flow via gravity into the sump assembly. Electrical conduit for conveying power and communication lines between the fuel dispenser and a remote location is positioned through an opening formed in the conduit entry frame adapter to allow the wire to enter the fuel dispenser housing through the footprint of the fuel dispenser without compromising the sump wall of the sump.

The invention, in another form thereof, includes a sump frame coupled to the sump wall, the sump frame having a sump frame opening aligned with the sump opening, so that the sump frame opening provides access to the cavity of the sump. In this form of the invention, the conduit entry frame adapter forms a part of the sump frame and extends beyond the exterior of the sump wall when the sump frame is coupled to the sump wall. In an embodiment of the invention, the conduit entry frame adapter angles downwardly into the cavity of the sump assembly to facilitate a gravity flow of fluid from within the fuel dispenser housing to the sump cavity.

The invention, in a further form thereof, provides a sump assembly for a fuel dispenser, the fuel dispenser having a housing including at least one substantially vertical wall defining a fuel dispenser footprint, the sump assembly including a sump having at least one sump wall defining a sump cavity and a sump frame removeably securable to the sump, the sump frame defining a dispenser perimeter that is coextensive with the substantially vertical wall of the fuel dispenser footprint, the sump frame further defining a sump perimeter that is coextensive with a portion of the sump wall defining the sump opening of the sump. The sump frame includes a conduit entry frame adapter spanning the dispenser perimeter of the sump frame and the sump perimeter of the sump frame, so that the sump assembly is alignable with the footprint of the fuel dispenser with the footprint of the fuel dispenser substantially coextensive with the sump assembly so that a fluid spill or a splash within the fuel dispenser housing will flow via gravity into the sump cavity.

The invention, in still another form thereof, comprises a method of containing fluid leaks occurring within a fuel dispenser, the fuel dispenser having a housing including at least one substantially vertical wall defining a fuel dispenser footprint, the method including the steps of: providing a sump frame including a dispenser perimeter that is coextensive with the substantially vertical wall of the fuel dispenser, a sump perimeter and a conduit entry frame adapter; securing the sump frame to a sump having a sump wall defining a sump cavity, the sump perimeter of the sump frame coextensive with the portion of the sump wall defining a sump opening of the sump, the conduit entry frame adapter spanning the dispenser perimeter of the sump frame and the sump perimeter of the sump frame; aligning the sump perimeter of the sump frame with the sump opening of the sump; and aligning the footprint of the fuel dispenser with the dispenser perimeter of the sump frame so that the footprint of the fuel dispenser is substantially coextensive with a sump assembly formed by the sump and the sump frame so that a fluid spill or splash within the fuel dispenser housing will flow via gravity into the sump cavity.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 3a is a sectional view of the sump frame of FIG. 3 taken along line 3a-3a;

Corresponding reference characters indicate corresponding parts throughout the several views. The exemplification set out herein illustrates an embodiment of the invention and such exemplification is not to be construed as limiting the scope of the invention in any manner.

DETAILED DESCRIPTION

Figure 1:
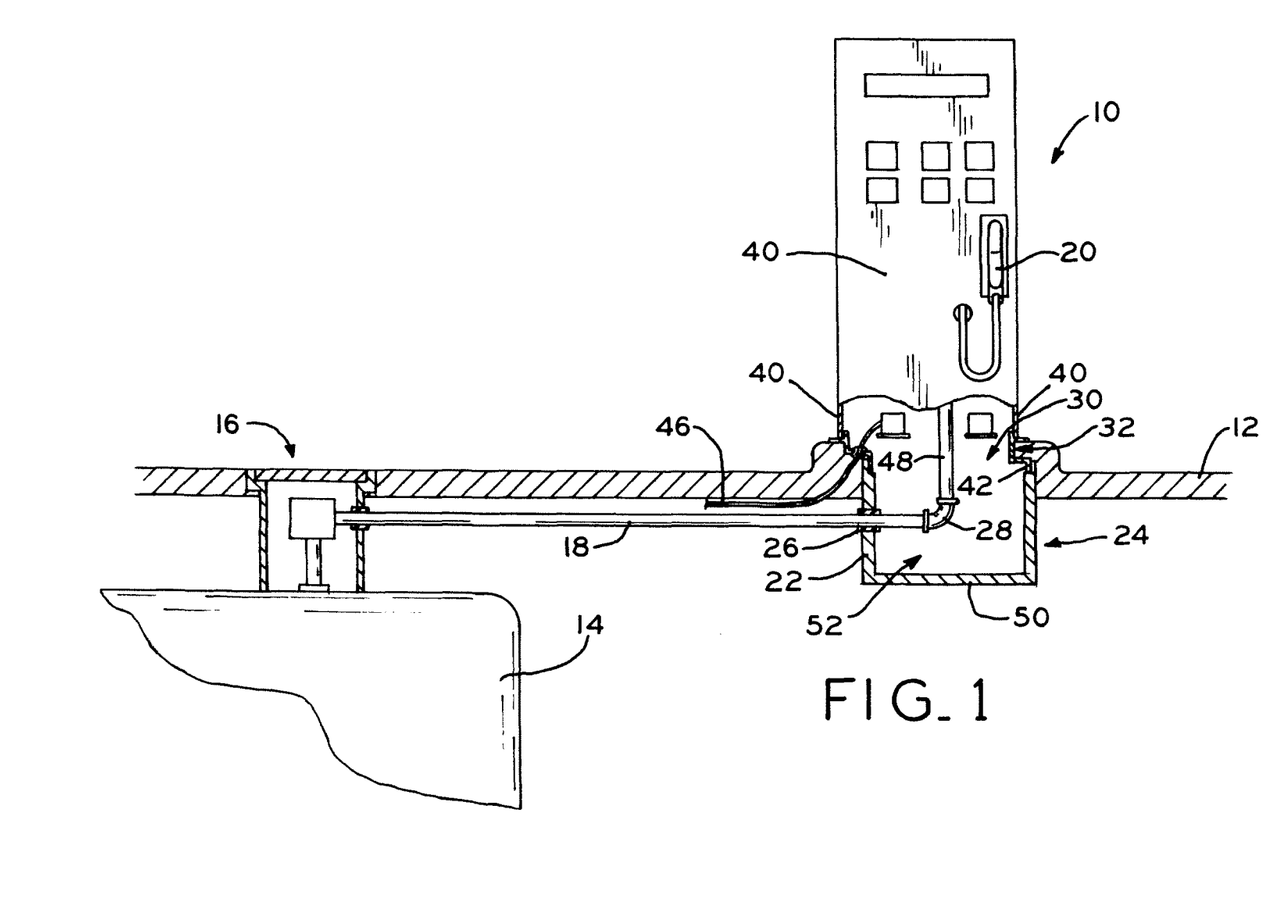
FIG. 1 is a schematic representation of a fuel dispensing station incorporating the sump in accordance with an embodiment of the present invention.

FIG. 1 illustrates a fuel dispensing station including fuel dispenser 10 positioned atop pavement 12. Positioned below pavement 12 is underground storage tank 14. Fill access 16 allows underground storage tank 14 to be filled by a tanker truck. Fuel delivery line 18 fluidly connects underground storage tank 14 with fuel dispenser 10. Fuel dispenser 10 includes internal piping to convey fuel from fuel delivery line 18 to dispenser nozzle 20. As shown in FIG. 1, fuel delivery line 18 traverses side wall 22 of sump 24 as it travels beneath the footprint of fuel dispenser 10. Seal 26 prevents leakage between sump 24 and the surrounding soil. Elbow 28 diverts fuel delivery line 18 from a generally horizontal path to a vertical path upward into fuel dispenser 10. Internal piping connects riser pipe 48 to dispenser nozzle 20.

Figure 2:
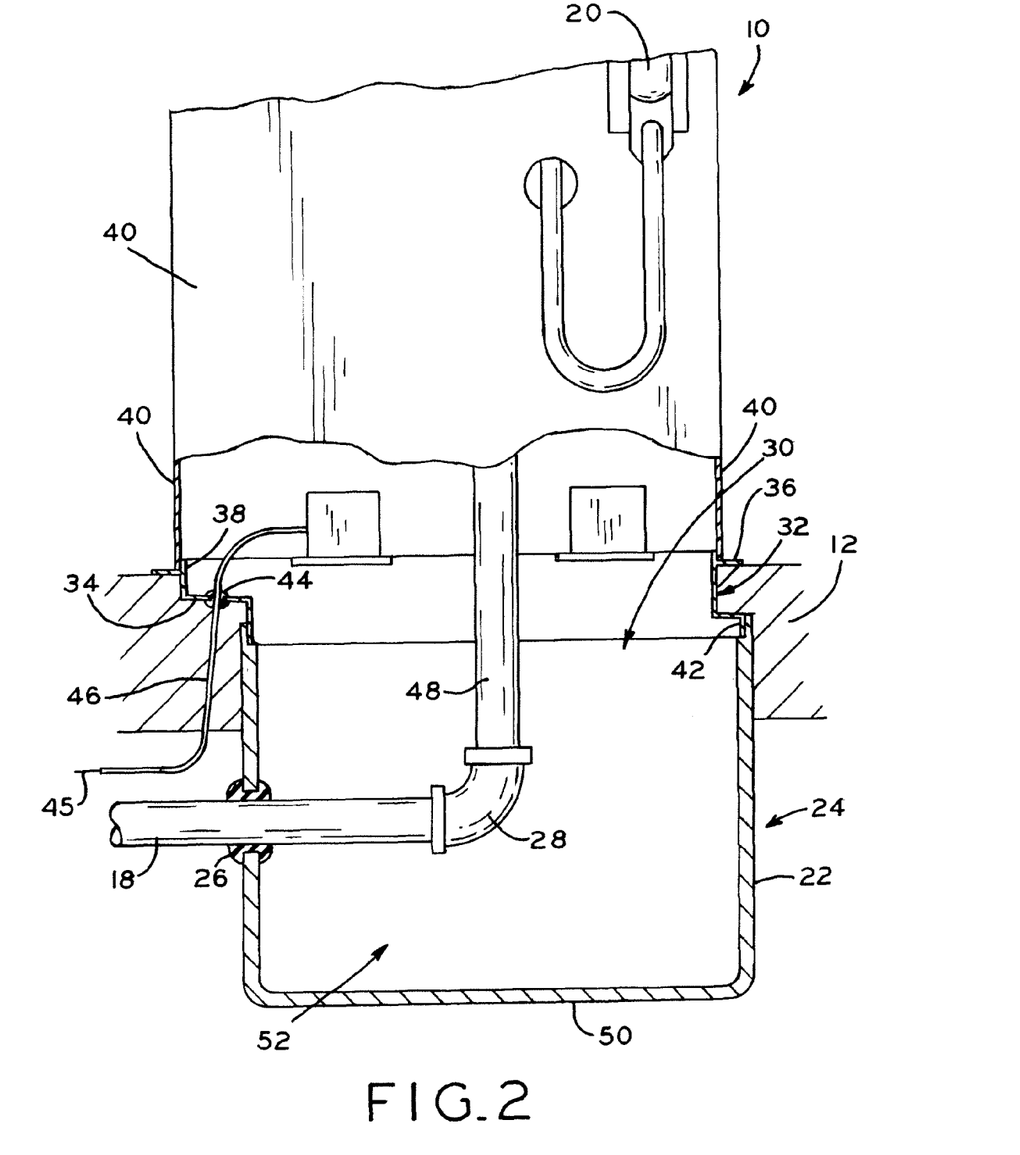
FIG. 2 is an enlarged, fragmentary view of a portion of the fuel dispenser and the associated sump illustrated in FIG. 1.
Figure 4:
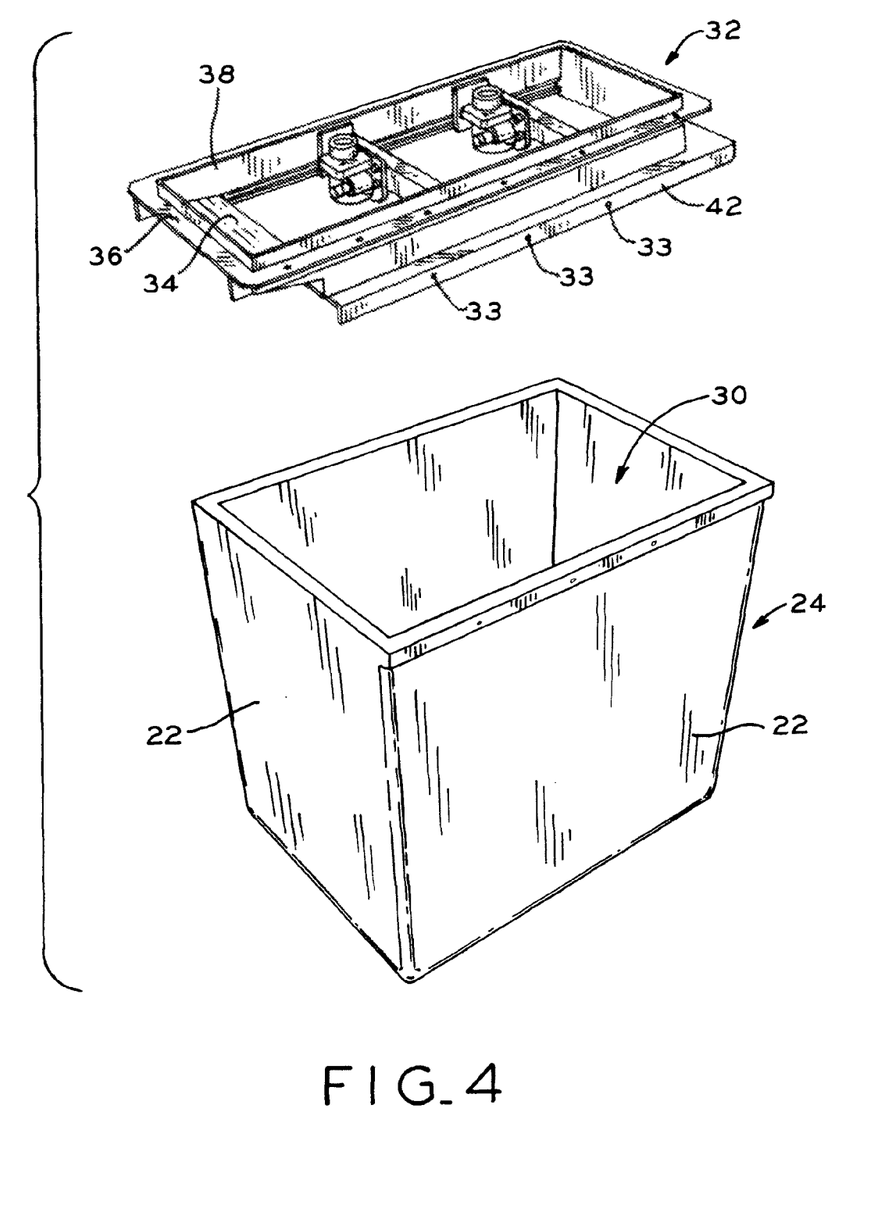
FIG. 4 is a perspective view of the sump shown in FIGS. 1 and 2 including the sump frame of FIG. 3.

Sump 24 is positioned below fuel dispenser 10 such that fluid contained within fuel dispenser 10, including fuel leaks from the piping contained within the dispenser will flow through sump opening 30 and be collected within sump 24. As illustrated in FIGS. 1, 2 and 4, sump 24 includes a plurality of sump side walls 22 preferably integral with sump bottom wall 50. Sump side walls 22 and sump bottom wall 50 cooperate to define sump cavity 52, which defines the containment area of the sump assembly. Sump cavity 52 is positioned to capture leaks occurring within the footprint of fuel dispenser 10 which is defined by the perimeter of dispenser walls 40.

The sump assembly of the present disclosure includes sump 24 and sump frame 32. As illustrated in greater detail in FIG. 2, sump frame 32 is connected to sump side wall 22 about sump opening 30. Sump frame 32 includes conduit entry frame adapter 34 which extends generally horizontally from sump frame 32. Sump frame 32, including conduit entry frame adapter 34 is illustrated in detail in FIGS. 3, 3a, 3b, 3c and 3d. FIG. 4 illustrates sump frame 32 detached from sump 24.

As illustrated, sump frame 32 includes flange 36 extending about its periphery. Sump frame 32 further includes upwardly extending member 38. As illustrated in FIG. 2, upwardly extending member 38 fits closely within dispenser wall 40 of fuel dispenser 10. Sump frame 32 further includes downwardly extending member 42 which mates with side wall 22 of sump 24. In the illustrated embodiment, downwardly extending member 42 is shown positioned within sump 24. In alternative embodiments, downwardly extending member 42 may be positioned outside of sump 24. As illustrated in FIGS. 1 and 2, sump opening 30 coincides with the majority of the footprint of fuel dispenser 10. Based on this construction, fluid within fuel dispenser 10, including fuel leaks from the piping contained within the dispenser, will be captured by sump 24. A small portion of the footprint of fuel dispenser 10 is not positioned over sump opening 30. This portion of the footprint of fuel dispenser 10 is positioned over conduit entry frame adapter 34, so that the sump assembly formed by sump 24 and sump frame 32 is coextensive with the footprint of fuel dispenser 10.

Figure 3:
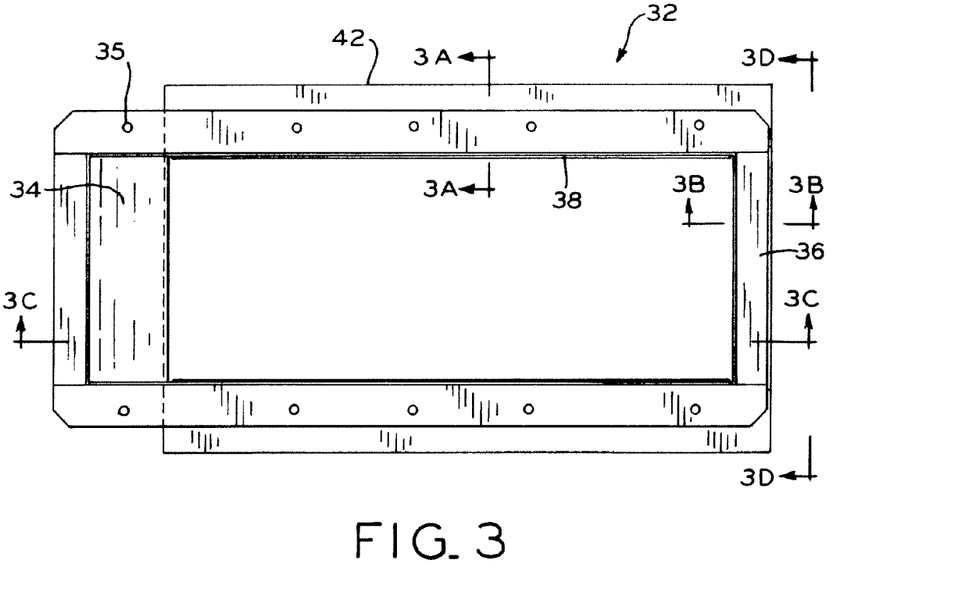
FIG. 3 is a plan view of the sump frame and conduit entry frame adapter of the present invention.
Figure 3A:
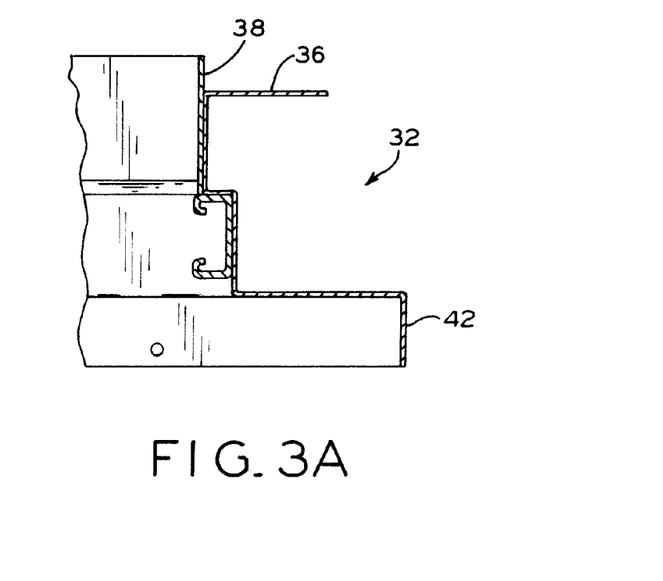
Figure 3B:
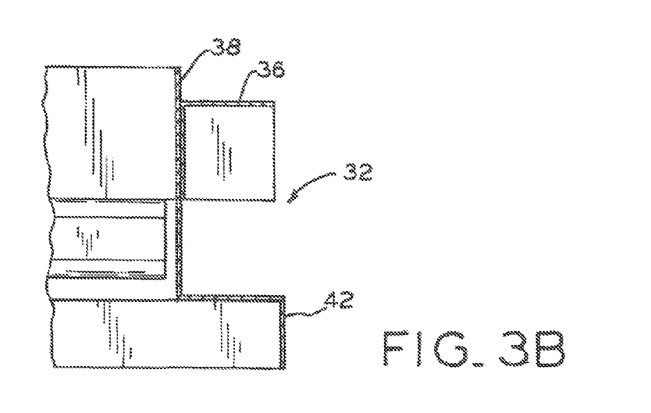
FIG. 3b is a sectional view of the sump frame of FIG. 3 taken along line 3b-3b.
Figure 3C:
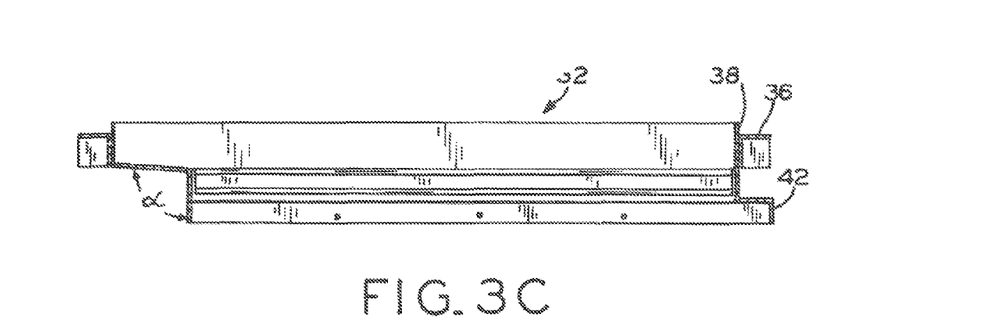
FIG. 3c is a sectional view of the sump frame of FIG. 3 taken along line 3c-3c.
Figure 3D:
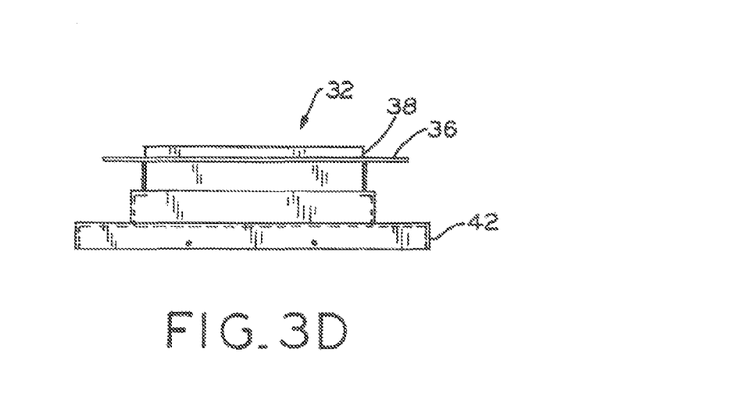
FIG. 3d is an end elevational view of the sump frame of FIG. 3.

As illustrated in FIG. 3c, conduit entry frame adapter 34 forms an angle α with downwardly extending member 42. Downwardly extending member 42 is generally vertically oriented. In one exemplary embodiment, the angle α is 93°. In this configuration, conduit entry frame adapter 34 slopes downwardly toward sump opening 30, which facilitates the flow of fluid which reaches conduit entry frame adapter 34 into sump opening 30. Stated another way, any fluid within fuel dispenser 10 which does not flow downwardly directly through sump opening 30 will contact conduit entry frame adapter 34 and flow, via gravity, into sump opening 30. As shown in FIG. 2, conduit entry frame adapter 34 includes seal 44 through which wiring conduit 46 is positioned. Wiring conduit 46 may be utilized for delivering wire 45 for conveying electrical energy to a pump and/or any other electrically powered components disposed within fuel dispenser 10. Wire 45 may also be utilized to convey communications to/from a remote location, including credit card information. While seal 44 may form a leak point in the construct of the current invention, it, advantageously, is not positioned within a side wall (22) of sump 24. Therefore, there exists a greatly reduced chance of leakage through wiring conduit 46 into the soil surrounding sump 24 because conduit entry frame adapter 34 is not utilized to retain fluid collected in sump 24, unlike side walls 22 of sump 24.

As described above, sump frame 32 includes upwardly extending member 38 which defines a dispenser perimeter of sump frame 32 that is coextensive with dispenser walls 40 which define the footprint of fuel dispenser 10. As further illustrated in the figures and described above, sump frame 32 includes downwardly extending member 42 which defines a sump perimeter of sump frame 32 that is coextensive with side wall 22 of sump 24. Conduit entry frame adapter 34 spans upwardly extending member 38 and downwardly extending member 42 at a location where the sump perimeter of sump frame 32 does not extend to the footprint of fuel dispenser 10. This structure allows the entire footprint of dispenser 10 to be positioned over the sump assembly formed by sump frame 32 and sump 24. Because sump opening 30 is smaller than the footprint of dispenser 10, conduit entry frame adapter 34 provides an access for wire 45 to enter dispenser 10 from below, without comprising sump side walls 22. Owing to the two-piece design of the sump assembly of the present invention, any sump having an opening sized greater than the sump perimeter of sump frame 32 is useable with sump frame 32 to provide vertical access from beneath the footprint of dispenser 10 without comprising a side wall of the sump. In an embodiment of the present disclosure a sump having an opening sized between the sump perimeter and the dispenser perimeter of sump frame 32 is utilized. Preferably, a sump useable in a sump assembly of the present invention will have a sump opening sized to match the sump perimeter of the sump frame of the present invention at all locations of the sump frame with the exception of the location of the conduit entry frame adapter. At the location of the conduit entry frame adapter, the sump opening can be sized between the sump perimeter of the sump frame and the dispenser perimeter of the sump frame.

The sump frame of the present invention is further useable with a pre-existing sump. Specifically, a sump frame of the present invention can be sized to have an inner perimeter corresponding to the opening to a pre-existing sump and an outer perimeter sized to correspond to the footprint of a dispenser to be positioned over the pre-existing sump. With this in mind, a dispenser can be removed and replaced with a new dispenser without regard to the footprint of the dispenser matching the opening to the pre-existing sump.

FIG. 4 illustrates sump frame 32 prior to its securement to sump 24. Referring to FIG. 3, sump frame 32 may be secured to sump 24 by passing one or more fasteners through apertures 33 in downwardly extending member 42 of sump frame 32 and securing the fastener(s) into corresponding apertures in sump 24. Similarly, sump frame 32 may be secured to fuel dispenser 10 by passing one or more fasteners through apertures 35 (FIG. 3) in flange 36 of sump frame 32 and securing the fastener(s) into corresponding apertures in fuel dispenser 10.

FIG. 4 further illustrates conduit entry frame adapter 34 before it is drilled to form the opening for wiring conduit 46. While conduit entry frame adapter 34 is illustrated as forming a part of sump frame 32, conduit entry frame adapter 34 may be integrally formed with a sump side wall 22.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel dispenser assembly, comprising:
   a fuel dispenser, comprising:
      a fuel dispenser housing including at least one substantially vertical wall defining a fuel dispenser footprint; and
      a nozzle;
   a fuel delivery line;
   a quantity of piping contained within said fuel dispenser housing, said piping fluidly connecting said fuel deliver line to said nozzle;
   a sump assembly, comprising:
      a sump comprising at least one sump wall defining a sump cavity;
      a sump frame removeably securable to said sump, said sump frame comprising a conduit entry frame adapter extending transverse to said substantially vertical wall of said fuel dispenser beyond an exterior of said sump wall, said conduit entry frame adapter positioned within said footprint of said fuel dispenser, said footprint of said fuel dispenser positioned atop said sump assembly, whereby said footprint of said fuel dispenser is substantially coextensive with said sump assembly so that a fluid spill or a splash within the fuel dispenser housing will flow via gravity into said sump assembly;
   at least one wire for conveying one of power and communication between said fuel dispenser and a remote location; and
   a conduit formed in said conduit entry frame adapter to allow said wire to pass through said conduit entry frame adapter vertically upwards through the fuel dispenser footprint to enter said fuel dispenser housing through said footprint of said fuel dispenser, without compromising said sump wall of said sump.

2. The fuel dispenser of claim 1, wherein said conduit entry frame adapter angles into said cavity of said sump assembly to facilitate a gravity flow of fluid from within said fuel dispenser housing to said sump cavity.

3. The fuel dispenser of claim 1, wherein said sump frame further comprises:
   an upwardly extending member defining a dispenser perimeter of said sump frame that is coextensive with said substantially vertical wall of said fuel dispenser; and
   a downwardly extending member defining a sump perimeter of said sump frame that is coextensive with a portion of said sump wall defining a sump opening of said sump, said conduit entry frame adapter spanning said dispenser perimeter of said sump frame and said sump perimeter of said sump frame.

4. The fuel dispenser of claim 1, wherein said sump frame further comprises an upwardly extending member defining a dispenser perimeter of said sump frame that is coextensive with said substantially vertical wall of said fuel dispenser.

5. The fuel dispenser of claim 1, wherein said sump frame further comprises a downwardly extending member defining a sump perimeter of said sump frame that is coextensive with a portion of said sump wall defining a sump opening of said sump.

6. The fuel dispenser of claim 1, wherein said conduit entry frame adapter is positioned relative to said sump opening so that a fluid contacting said conduit entry frame adapter will flow through said sump opening into said sump cavity.

7. A method of containing fluid leaks occurring within a fuel dispenser, the fuel dispenser having a housing including at least one substantially vertical wall defining a fuel dispenser footprint, said method comprising:

aligning the fuel dispenser with a sump assembly comprising:
- a sump frame comprising:
  - a dispenser perimeter that is coextensive with the substantially vertical wall of the fuel dispenser;
  - a sump perimeter defining an opening through the sump frame; and
  - a conduit entry frame adapter;
  - said sump frame secured to a sump having a sump wall defining a sump cavity, the sump having a sump opening providing access to the sump cavity, the opening through the sump frame aligned with the sump opening so that a gravity flow of fluid is capable of passing through the opening through the sump frame, through the sump opening and into the sump cavity, said conduit entry frame adapter extending outwardly from said sump wall so that the conduit entry frame adapter is capable of allowing a wire to pass through a conduit entry frame adapter hole in said conduit entry frame adapter vertically upwards from a location exterior of the sump beyond a perimeter of the sump opening; and said step of aligning the fuel dispenser with the sump assembly further comprising the step of aligning the footprint of the fuel dispenser with said sump assembly so that the conduit entry frame adapter is positioned within the footprint of the fuel dispenser so that a fluid spill or a splash within the fuel dispenser housing will flow via gravity into the sump cavity and so that a wire passing through the conduit entry frame adapter hole in the conduit entry frame adapter may pass vertically upwards from a location exterior of the sump beyond a perimeter of the sump opening, through the conduit entry frame adapter and into the dispenser housing through the fuel dispenser footprint.

8. The method of containing fluid leaks occurring: within a fuel dispenser of claim 7, wherein the conduit entry frame adapter angles into said sump cavity.

9. The method of containing fluid leaks occurring within a fuel dispenser of claim 7, wherein said sump frame further comprises an upwardly extending member defining said dispenser perimeter of said sump frame.

10. The method of containing fuel leaks occurring within a fuel dispenser of claim 7, wherein said sump frame further comprises a downwardly extending member defining said sump perimeter of said sump frame.

11. The method of containing fuel leaks occurring within a fuel dispense of claim 9, wherein said sump frame further comprises a downwardly extending member defining said sump perimeter of said sump frame.

12. A sump assembly for a fuel dispenser, the fuel dispenser having a housing including at least one substantially vertical wall defining a fuel dispenser footprint, said sump assembly comprising:

a sump comprising at least one sump wall defining a sump interior defining a sump cavity, the sump having a sump opening providing access to said sump cavity; and a sump frame securable to said sump, said sump frame including a conduit entry frame adapter, with said sump frame secured to said sump, said conduit entry frame adapter extending outwardly from said sump wall so that the conduit entry frame adapter is capable of allowing a wire to pass through a conduit entry frame adapter hole in said conduit entry frame adapter vertically upwards from a location exterior of the sump beyond a perimeter of the sump opening, through the conduit entry frame adapter within the fuel dispenser footprint without compromising said sump wall of said sump, said conduit entry frame adapter positioned so that a gravity flow of fluid within the fuel dispenser is capable of encountering the conduit entry frame adapter and so that if the gravity flow of fluid encounters the conduit entry frame adapter it will thereafter flow via gravity into the sump cavity through the sump opening.

13. The sump assembly of claim 12, wherein the conduit entry frame adapter angles into said cavity of said sump.

14. The fuel dispenser of claim 12, wherein said sump frame further comprises an upwardly extending member defining a dispenser perimeter of said sump frame, the dispenser perimeter coextensive with the substantially vertical wall of the fuel dispenser defining the fuel dispenser footprint.

15. The fuel dispenser of claim 14, wherein said sump frame further comprises a downwardly extending member defining a sump perimeter of said sump frame.

16. The fuel dispenser of claim 12, wherein said sump frame further comprises a downwardly extending member defining a sump perimeter of said sump frame.

* * * * *

UNITED STATES PATENT AND TRADEMARK OFFICE
CERTIFICATE OF CORRECTION

Page 1 of 2

PATENT NO.        : 9,114,973 B2
APPLICATION NO.   : 12/702541
DATED             : August 25, 2015
INVENTOR(S)       : Gary J. Saltz and Verge Manyen It is certified that error appears in the above-identified patent and that said Letters Patent is hereby corrected as shown below:

In the drawings:

Delete drawing sheet 4, and replace with drawing sheet 4 (attached)

In the claims:

Claim 1, Column 6, Line 13, delete "deliver" and insert --delivery--

Signed and Sealed this
Twenty-ninth Day of March, 2016

Michelle K. Lee
*Director of the United States Patent and Trademark Office*